May 25, 1943. S. J. NORDSTROM 2,319,943
PRESSURE BALANCED PLUG VALVE
Filed Aug. 17, 1940 2 Sheets-Sheet 1
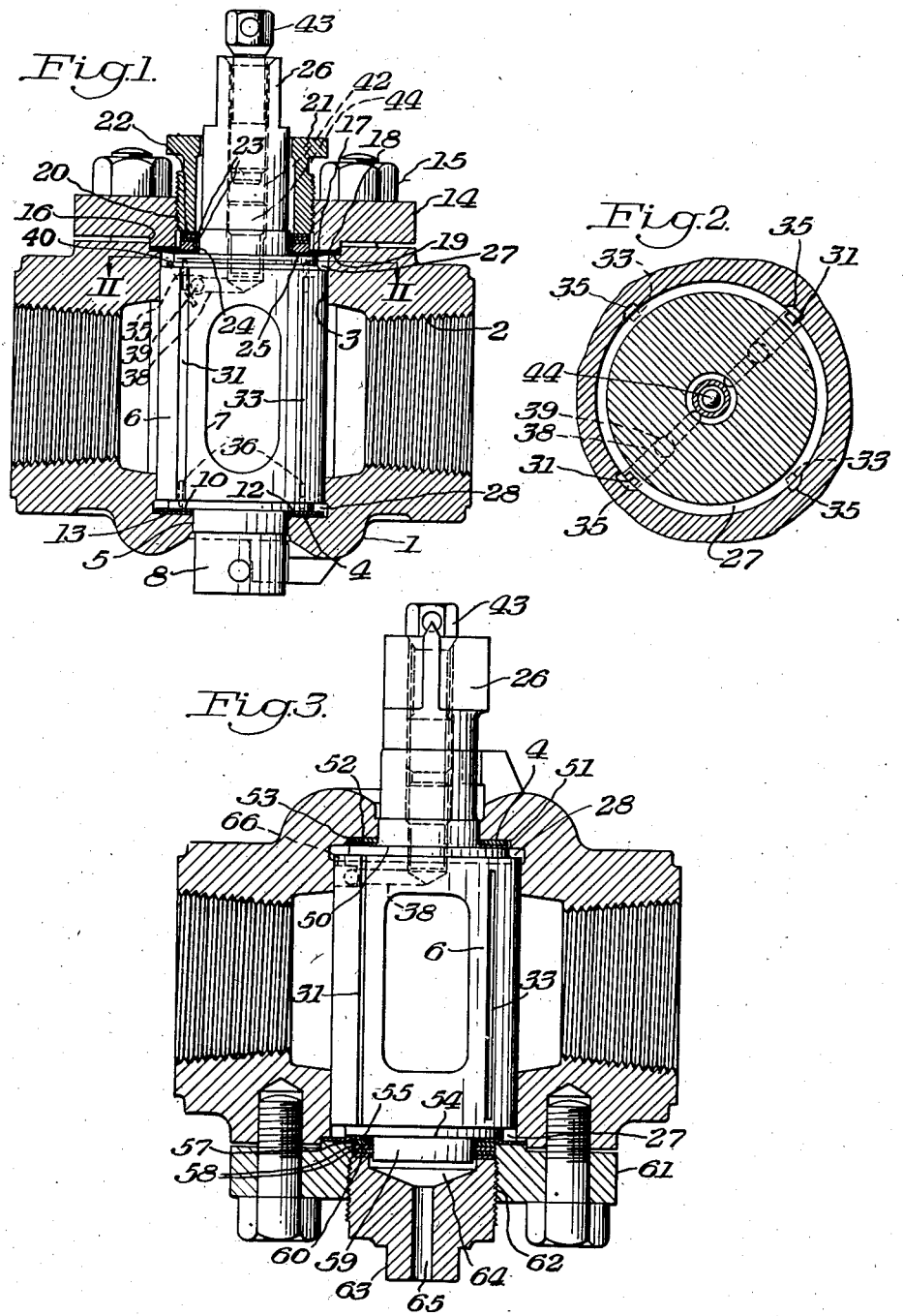
INVENTOR.
Sven J. Nordstrom
BY
Lewis D. Koningsford
ATTORNEY.

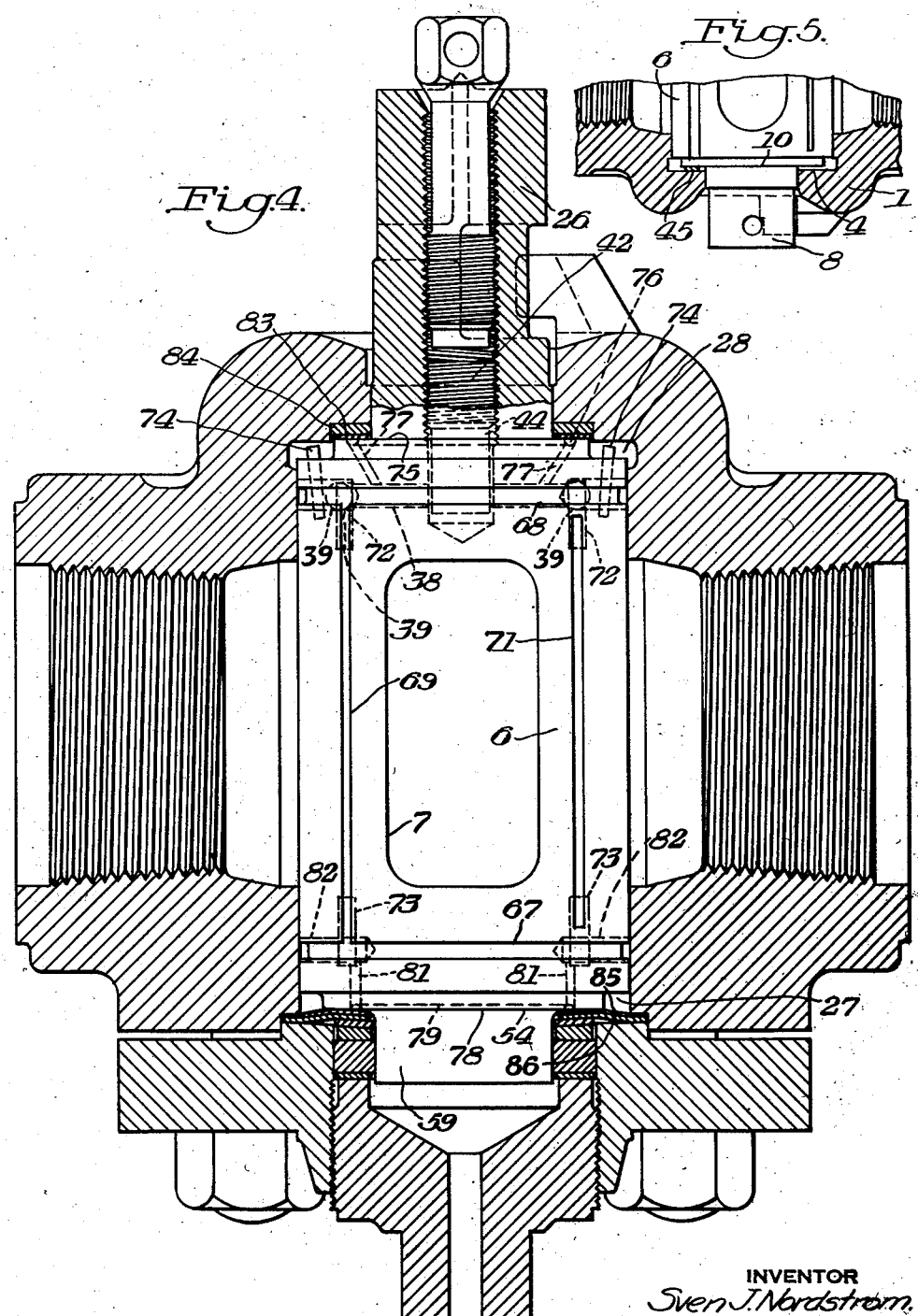

Patented May 25, 1943

2,319,943

UNITED STATES PATENT OFFICE 2,319,943

PRESSURE BALANCED PLUG VALVE

Sven J. Nordstrom, Lafayette, Calif., assignor to Merco Nordstrom Valve Company, Pittsburgh, Pa., a corporation of Pennsylvania Application August 17, 1940, Serial No. 353,075

6 Claims. (Cl. 251—93)

It has heretofore been recognized that in plug valves imperfect contact of the plug and seat resulting in a clearance on the order of several ten thousandths of an inch can effectively be sealed by a plastic or lubricant to prevent leakage through the valve even at high pressures. An extensive film of this degree of attenuation heretofore has been attained commercially in the lubricant jacked type of tapered plug valve in which a thick film first is introduced between the surfaces and then is extruded to the required thin film by axial movement of the plug. However, one disadvantage of the tapered type of plug valve is the relatively high resistance to turning encountered in operating the valve, this being in part due to the bearing pressure of the plug against its seat. Attempts heretofore have been made to produce a tapered plug valve in which the resistance to turning from this cause is overcome by providing a predetermined clearance between the plug and its seat. However, such structures have been unable to maintain the clearance on the order of one or two ten thousandths of an inch or even less than one thousandth of an inch so that the sealing by lubricant was not effective. Furthermore, in such a valve the line pressure and lubricant pressure exerted on the plug produce an endwise thrust which holds the plug against its end bearing and produces about as great resistance to turning as occurs in the lubricant jacked type of valve. While the cylindrical type of plug valve appeared to offer possibilities of balancing the end thrust of line pressure, it is not possible in commercial production to consistently provide on a commercial scale a fit closer than about five thousandths of an inch difference in diameters, and accordingly the lubricant seal provided in this type of valve has not been effective.

It is an object of the present invention to provide a plug valve in which the plug has a predetermined small clearance with its seat on the order of several ten thousandths of an inch which can be maintained under practical operating conditions.

Another object is the provision of a novel apparatus and method for positioning the tapered plug of a plug valve to provide a predetermined clearance between the plug and its seat.

Another object of my invention is to provide a plug valve in which the axial forces exerted on the plug are substantially counterbalanced.

A further object of my invention is to provide a valve which is sealed by lubricant under pressure and in which the axial force of lubricant pressure against the plug is substantially counterbalanced.

Another object is the provision of a plug valve having mutually reactive seals for the ends thereof which are counterbalanced.

Another object is the provision of a plug valve having mutually reactive seals for the ends thereof which are relatively stable and require infrequent adjustment.

According to the present invention I provide a plug valve having a small angle of taper of the plug and seat and I maintain the plug in predetermined position relative to the seat to provide a predetermined minimum clearance between the plug and its seat on the order of less than five ten thousandths (.0005) inch difference in diameters. The angle of taper is such that wear of the positioning means or jacking of the plug, where such jacking is employed, will not vary the clearance beyond that required for adequate lubricant sealing or free turning. Because of the small taper of the plug a relatively great axial movement thereof will not increase the clearance beyond that required for effective film sealing, so that a delicate adjusting device is not required. Also, because of the small angle of taper the line pressure on the ends of the plug will be substantially balanced. I prefer to maintain this clearance by a shim or washer interposed between one end of the plug and a shoulder provided in the casing.

In that type in which the valve plug has an integral operating stem extending from the casing, I provide an auxiliary stem at the opposite end of the plug extending to the exterior and of substantially equal cross sectional area, thereby substantially equalizing the axial pressures on the plug. The axial thrust of the lubricant on the plug may be counterbalanced by providing lubricant chambers at each end of the plug. Also mutually reactive seals for the ends of the plug are provided so that they may be simultaneously adjusted, these seals being of a type requiring only infrequent attention.

A lubricant or plastic sealing medium is supplied under pressure to the clearance space by suitable arrangement of lubricant distributing grooves, preferably substantially completely surrounding the port in the plug in closed position so as to seal the clearance space between the plug and body to prevent leakage therethrough. The lubricant film thus provided is on the order of several ten thousandths of an inch and is effective in preventing the leakage of line fluid through the valve. If desired, the lubricant distributing grooves that are exposed to the line fluid in opening or closing of the valve may be arranged to be disconnected from the source of lubricant pressure when they are in exposed position, and a stop provided to limit rotation of the plug to ninety degrees. Also, if desired, the valve may be constructed to permit jacking of the plug by lubricant pressure.

For a detailed description of the invention, reference is made to the following specification taken in connection with the accompanying drawings, wherein I have shown preferred embodiments of the invention by way of example, and wherein:

Figure 1 is a longitudinal sectional view of a preferred embodiment of my invention, Figure 2 is a transverse section taken on line II—II of Figure 1, Figure 3 is a view similar to Figure 1 of a further preferred embodiment, Figure 4 is a longitudinal sectional view of a further preferred modification, and Figure 5 illustrates a preferred method and apparatus for providing a predetermined clearance in tapered valves.

Referring to Figure 1 of the drawings, there is shown a casing 1 having a passageway 2 therethrough for flow of fluid and a bore 3 extending transversely of the passageway terminating at its one end in a shoulder 4 having a bore 5 therethrough. A plug 6 is located in the bore 3 and has a port 7 therethrough adapted to register with passageway 2 in open position of the valve. Preferably the bore 3 and plug 6 have a slight taper, and it will be apparent that by predetermining the normal position of the plug in the bore the clearance between the plug and seat may be predetermined to any desired size. Plug 6 has a stem 8 merging at one end thereof with the shoulder 10 thereof, and extending through bore 5 to the exterior, and an inner shim or washer 12 of carbon steel, stainless steel or other suitable metal, and an outer washer 13 of sheet asbestos packing or other suitable resilient material preferably are interposed between shoulders 10 and 4. It will be apparent that the combined thickness of washers 12 and 13 determine the location of the plug in its seat, and hence determine the clearance between the plug and seat. Preferably, this clearance is on the order of about one ten thousandth (.0001) to five ten thousandths (.0005) inch on the diameter, as a clearance of this order may be effectively sealed by a lubricant film. The taper of the plug is made exceedingly small, preferably on the order of about one half degree. In a preferred embodiment I employ a half angle of taper of about seventeen minutes, whose tangent is about .005, so that the taper may be considered as .005 inch per inch.

Referring to Figure 5, I have illustrated one method for locating the plug axially in its seat to produce the desired clearance. A small piece of lead 45 (not a complete washer) or other suitable plastic material, is placed on shoulder 4, and the valve 6 is assembled with the plug brought into full contact with its seat. This results in compression of the lead piece 45 to substantially the thickness of the space between the shoulder 10 of the plug and the shoulder 4 of the casing. The lead piece 45 then is removed, and its thickness accurately calipered. The valve is then reassembled and this time an assembly comprising washers 12 and 13 and a spacing washer if required is placed between the shoulders 10 and 4, the total thickness of this assembly being sufficiently greater than the lead piece 45 to give the desired predetermined clearance between the plug and seat. Thus, in the case of a plug having a half angle of taper whose tangent is .005, a washer assembly one-hundredth of an inch thicker than the lead piece 45 will create a change in clearance of about half a ten thousandth of an inch, which is sufficient to relieve the seating pressure of the plug on the seat and is also of such order as may be effectively sealed by a lubricant film.

A cover 14, which may be considered as a part of the casing, is secured to the casing or body by any suitable means, as for example, by stud bolts and nuts 15 and, as shown, has an annular flange 16 engaging the outer peripheries of a plurality of washers 17 and 18 bearing on a shoulder 19 of the body surrounding bore 3. Preferably inner washer 17 is made of thin suitable metal and outer washer 18 is made of sheet asbestos packing or other suitable resilient material. Cover 14 has a threaded bore 20 adapted to receive a metal thrust ring 24 bearing on the inner peripheries of washers 17 and 18 to hold them against the shoulder 25 of the plug. A plurality of resilient thrust rings 23 of suitable thickness, made of sheet asbestos packing or other suitable resilient material, are superposed on thrust ring 24, and a metal wear ring 22 is located on thrust ring or packing 23. A threaded gland 21 received in bore 20 adjusts the pressure of the packing assembly against the shoulder 25 of the plug. It will be apparent that adjustment of gland 21 also adjusts the pressure exerted by the plug on the packing rings 12, 13, so that the packings at the ends of the plug may be simultaneously and equally adjusted.

A stem 26 for operating the valve, which preferably is integral with the plug but may be separate therefrom, if desired, extends through the packing assembly and gland 21 in the cover. The valve is thus sealed against leakage to the exterior by the resiliently backed metal washer 12 engaging shoulder 10, and the resilient backed washer 18 engaging shoulder 25. The only point of wear in the packing is the surface between washers 12 and 18 and their respective shoulders of the plug, and in view of this small wear frequent adjustment of the packing is not necessary. Furthermore, no lateral thrust is required to make the packing act as a seal, so that the entire thrust of the packing on the plug is counterbalanced.

The shoulders 25 and 10 of the plug are reduced to provide annular chambers 27 and 28 respectively; and these chambers preferably have the same axially projected area on shoulders 10 and 25 of the plug. Thus, in a tapered plug valve the grooves or chambers 27 and 28 will be of unequal radial depth depending on the diameters thereof. The sealing of shoulders 10 and 25 to prevent leakage therethrough is facilitated by introducing a plastic lubricant under pressure into chambers 27 and 28. Grooves or chambers 27 and 28 may form a portion of the lubricant distribution grooves for the working surfaces of the valve, if desired, and they may be interconnected by a diametrically opposed pair of longitudinal distributing grooves 31 in the plug surface. A second pair of longitudinal distributing grooves 33 in the plug surface terminate short of the grooves 27 and 28 and are connected thereto in full open and full closed positions by four dwarf grooves 35 at the top and four dwarf grooves 36 at the bottom of bore 3. A radial duct 38 having a ball check valve 39 therein, held in place by a pin 40 extending across duct 38, connects grooves 31 with the reservoir 42 adapted to contain lubricant, and a screw 43 may be employed to place the lubricant in the reservoir under pressure and force it to the lubricant distribution groove system. If desired, a check valve 44 of suitable construction may be located in the reservoir to assist in preventing reflux of lubricant and escape of line fluid when the screw 43 is removed.

In operation, lubricant is supplied under pressure from the reservoir 42 by radial duct 38 to vertical grooves 31 in the plug, and circumferential grooves or recesses 27 and 28 connected thereto. The lubricant in chambers 27 and 28 is forced into any irregularities between shoulder 25 and diaphragm 18, and between shoulder 10 and diaphragm 12, and may compress the resilient backing washers 17 and 13 sufficiently to permit entrance of lubricant between the plug shoulders and contacting sealing diaphragms. In operation of the valve, this lubricant is distributed as a sealing film therebetween, which also lubricates the contacting surfaces to reduce friction therebetween. As the effective radial areas of chambers 27 and 28 are equal, the axial thrust of lubricant pressure or line fluid in chamber 27 is counterbalanced by the pressure in chamber 28. In full open or full closed position lubricant is distributed from chambers 27 and 28 through dwarf grooves 35 and 36 to longitudinal grooves 33, and when sufficient pressure is built up in the lubricant groove system a film of sealing lubricant is forced or extruded from grooves 27, 31, 28 and 33 at each end of the plug port between the plug and body substantially completely surrounding the passageway through the valve. It will be apparent that in intermediate positions when grooves 33 are exposed to the passageway they are disconnected from grooves 27 and 28 and the remainder of the lubricant groove system. By adjusting gland 26 to adjust the yielding action of washers 13, 18 and 23, the valve may be adjusted for various working pressures to prevent leakage to the exterior at the preferred working pressure. This is accomplished without unbalancing the axial force of packing, line fluid or lubricant exerted on the plug.

In Figure 3 I have shown a modification of the invention, which may be applied to cylindrical or tapered plug valves. When applied to tapered plug valves, the operating stem is at the smaller end of the plug. In this modification, a shoulder 50 is formed at the smaller end of the plug, the shoulder 4 of the casing is recessed at 51 and receives a metal shim 52 backed by a resilient gasket 53 of suitable thickness which, in a tapered valve, gives the desired radial clearance between the plug and seat. At the larger end the plug has a shoulder 54 against which bears the metal diaphragm or washer 55, the outer periphery of which is clamped between the cover and casing. A metal thrust ring 57 bears on the inner periphery of diaphragm 55, and resilient thrust rings 58 of asbestos or other suitable material are superposed on thrust ring 57 and surround the stub 59, a metal wear washer 60 being superposed on the washers 58. The cover 61 has a threaded recess 62 which receives the threaded adjustment gland 63 which may have a recess 64 to receive the stub 59 of the plug. Gland 63 also has a hole 65 bored therethrough to expose the stub 59 to atmospheric pressure.

The lubricant distribution grooves in this modification are exactly like those shown in Figure 1, excepting that radial groove 38 is displaced with respect to groove 31 and is connected to chamber 28 by a bore 66.

In the modification shown in Figure 4, circumferential lubricant distribution grooves 67 and 68 are formed in the plug 6 spaced from the chambers 27 and 28 at the ends. Two diametrically opposed grooves 69 in the plug connect grooves 67 and 68, and two diametrically opposed grooves 71 on the opposite side of port 7 terminate short of the grooves 67 and 68, and are connected thereto in full open and full closed positions of the valve by four dwarf grooves 72 and 73 at each end of the seat. Radial ducts 38, having ball check valves 39 therein, held in position by pins 74, connect the lubricant reservoir 42 with the circumferential groove 68. The shoulder 75 at the stem end of the plug has a groove 76 in the surface thereof which is supplied with lubricant under pressure by ducts 77 bored through the shoulder and connected with radial ducts 38. At the opposite end of the plug the shoulder 78 has a similar circumferential groove 79 in the surface thereof connected by bored ducts 81 with counterbores 82 drilled radially in the plug from groove 67.

It will be seen that the stem shoulder 75 is sealed by the metal washer 83 backed by resilient washer 84 and bearing against the shoulder, the annular groove 76 supplying an unbroken annulus of lubricant to the contacting surfaces at the shoulder to lubricate them and assist in the sealing thereof. At the opposite end the shoulder 78 is similarly sealed by metal washer 85 backed by resilient washer 86, and is lubricated by annular groove 79 which assists in sealing the shoulder. Chambers 27 and 28 are not connected to the lubricant groove system and therefore serve as line pressure balancing members, and by having stems 26 and 59 of equal areas, all axial forces on the plug will be counterbalanced. The passageway through the valve is sealed at each end of the plug port by lubricant supplied between the working surfaces of the plug and seat by the groove system comprising circumferential groove 68, longitudinal grooves 69 and 71 and circumferential groove 67 connected in full open and full closed positions by dwarf grooves 72 and 73. Although I have shown four dwarf grooves at each end of the plug, it will be understood that in the various modifications in the drawings, only two dwarf grooves may be supplied at each end, arranged to provide a substantially closed circuit groove when the plug is in closed position only. Accordingly, in open position the passageway will not be completely surrounded. Also, if desired, the area of grooves 27 and 28 may be made unequal with groove 28 the larger in Figures 1 and 3, thus providing for unequal axial lubricant forces to jack the plug or move it axially. The invention may be embodied in other specific forms without departure from the spirit or essential characteristics of the present invention. The specific form described herein, therefore, is to be considered in all respects as illustrative and not restrictive of the invention.

What I claim as my invention and desire to secure by United States Letters Patent is:

1. In a plug valve, a casing having a passageway therethrough for flow of fluid and having a bore transversely of the passageway, a plug rotatably positioned in said bore and having a port therethrough adapted to register with said passageway when the valve is in open position, annular shoulders at each end of the plug, stems extending from said shoulders and exposed to atmospheric pressure, abutting surfaces on said casing engaging said shoulders, said plug having reduced peripheral portions providing annular areas adjacent the peripheries of said shoulders, means for supplying lubricant under pressure to said reduced peripheral portions the projected area of said shoulders being equal and the projected area of said peripheral areas being equal whereby axial pressures on the plug are balanced.

2. In a plug valve, a casing having a passageway therethrough for flow of fluid and having a bore transversely of the passageway, a rotatable valve plug disposed within said bore and having a hole adapted to register with the passageway when the plug is in open position, annular shoulders at each end of the plug, stems extending from said shoulders and exposed to equal pressures, at each end thereof, means carried by said casing providing surfaces engaging said shoulders in sealing relation, said plug having reduced peripheral portions providing annular chambers adjacent said shoulders, means for resiliently maintaining said surfaces and shoulders in engagement, and means for supplying lubricant under pressure to said chambers.

3. Apparatus as defined in claim 2 wherein one of said surfaces comprises a diaphragm enclosing one of said chambers and engaging a plug shoulder at its inner periphery and sealed with respect to the casing at its outer periphery.

4. Apparatus as defined in claim 2 wherein one of said surfaces is integral with the casing and has an aperture therein to receive one of said stems, and the other surface comprises a cover removably engaging said casing at the end opposite said first surface and having an aperture therein to receive the other of said stems.

5. Apparatus as defined in claim 2 wherein one of said surfaces comprises a resiliently backed metal washer between a fixed portion of the casing and a shoulder of the plug.

6. In a plug valve, a valve casing having a passageway therethrough for flow of fluid, a rotatable valve plug disposed within said casing and having a port therethrough adapted to register with the passageway when the plug is in open position, an annular shoulder at each end of the plug, abutting surfaces on said casing engaging said shoulders, said plug having reduced peripheral portions providing annular chambers adjacent hereto, one of said abutting surfaces comprising a diaphragm enclosing one of said chambers and engaging a plug shoulder at its inner periphery and sealed with respect to the casing at its outer periphery, and the other of said surfaces comprises a resiliently backed metal washer between a fixed portion of the casing and a shoulder of the plug, and resilient means engaging the inner periphery of the diaphragm, whereby said abutting surfaces are held against the plug shoulders.

SVEN J. NORDSTROM.